United States Patent [19]
van der Lely

[11] 4,029,154
[45] June 14, 1977

[54] SOIL CULTIVATING MACHINES

[76] Inventor: Cornelis van der Lely, 7, Bruschenrain, Zug, Switzerland

[22] Filed: Oct. 15, 1975

[21] Appl. No.: 622,451

[30] Foreign Application Priority Data

Oct. 15, 1974 Netherlands .................. 7413513

[52] U.S. Cl. ............................. 172/91; 172/540
[51] Int. Cl.² ............... A01B 33/02; A01B 33/14; A01B 35/27
[58] Field of Search ........... 172/91, 540, 555, 603, 172/604, 68

[56] References Cited
UNITED STATES PATENTS

| | | | |
|---|---|---|---|
| 398,648 | 2/1889 | Paterson | 172/91 X |
| 466,771 | 1/1892 | Clark | 172/555 X |
| 833,392 | 10/1906 | Hudson | 172/91 |
| 1,155,349 | 10/1915 | Geisler | 172/603 |
| 1,203,737 | 11/1916 | Hoar | 172/603 |
| 2,521,109 | 9/1950 | Wiltein | 172/555 |
| 3,616,862 | 11/1971 | van der Lely | 172/68 X |
| 3,774,688 | 11/1973 | van der Lely et al. | 172/68 X |

*Primary Examiner*—Paul E. Shapiro
*Attorney, Agent, or Firm*—Mason, Mason & Albright

[57] ABSTRACT

A soil cultivating machine has a cultivating member that is driven to rotate about a support that defines a horizontal axis extending transverse to the direction of travel. Radial arms fastened to brackets along the length of the support in helical rows mount freely rotatable discs or strips at their outer ends and the discs or strips each comprise means that rotate about corresponding axes of rotation that are non-perpendicularly inclined to the horizontal axis. Each soil working means is positioned along the length of said support to successively work an adjacent strip of land and the axes of rotation of the discs or strips are inclined to one another.

12 Claims, 6 Drawing Figures

SOIL CULTIVATING MACHINES

Figure 1:
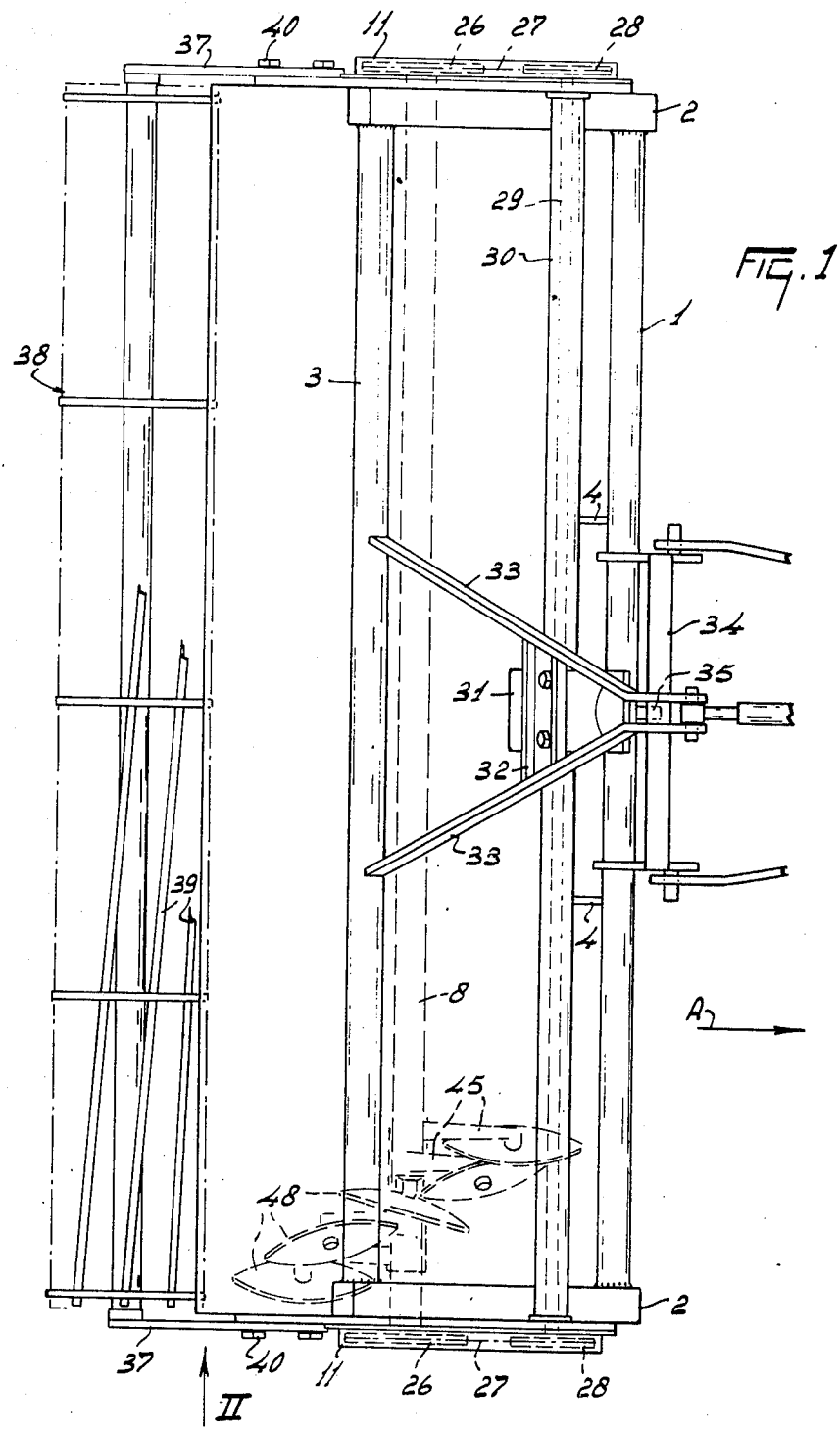
Figure 2:
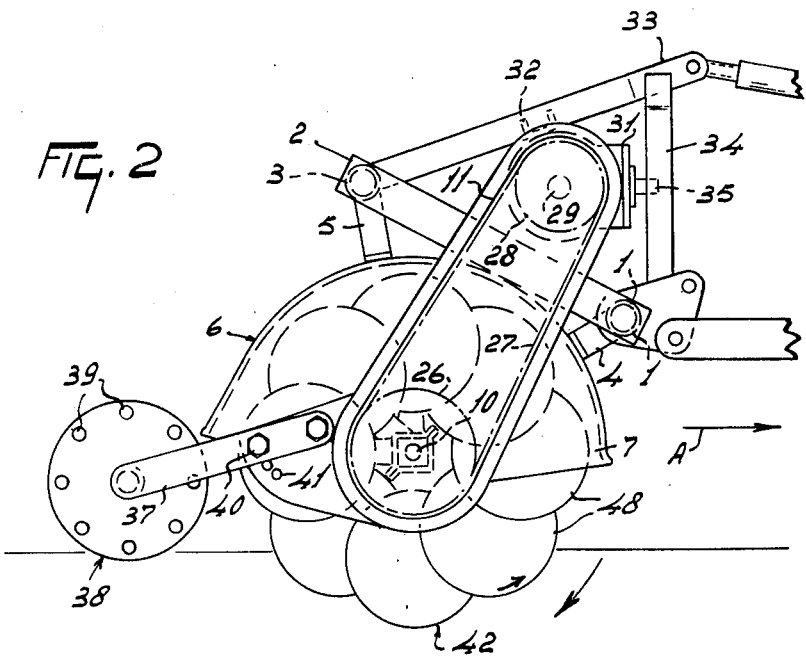
Figure 3:
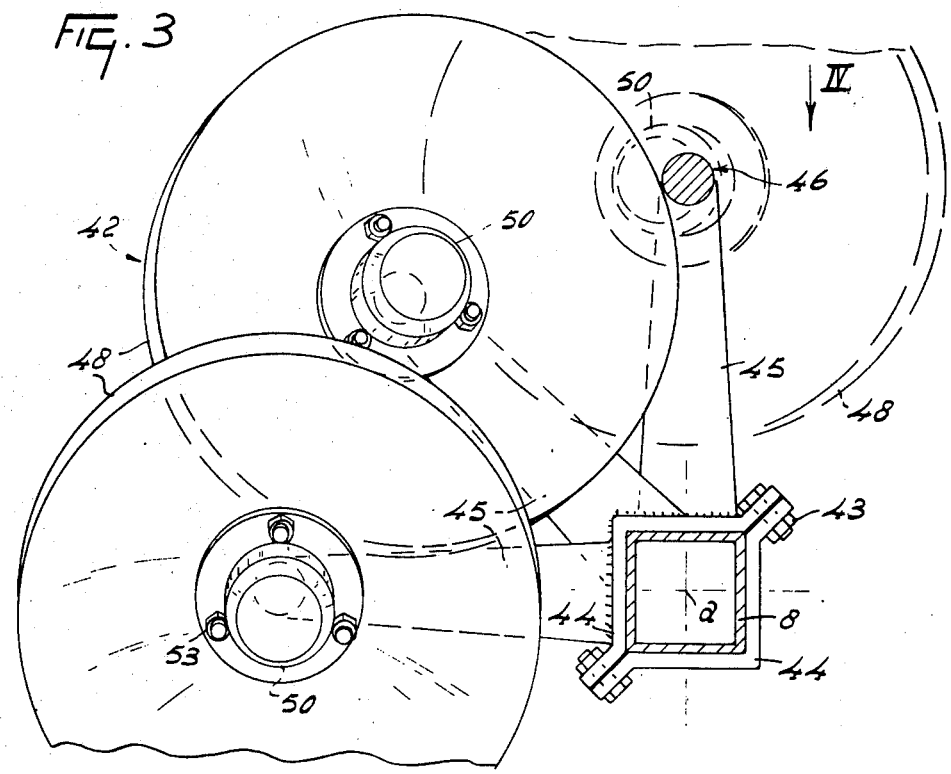
Figure 4:
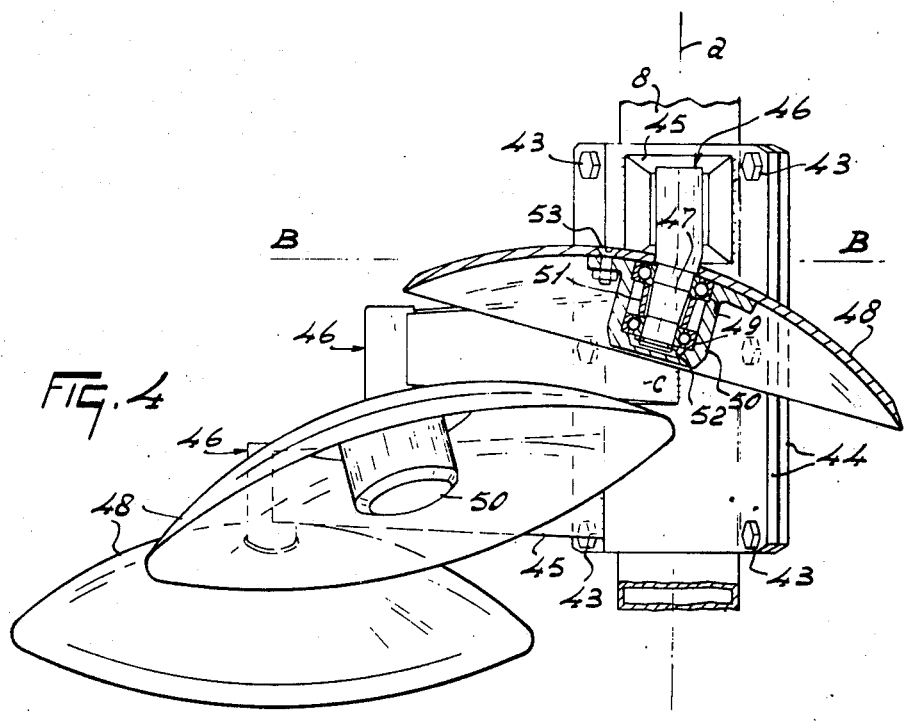
Figure 5:
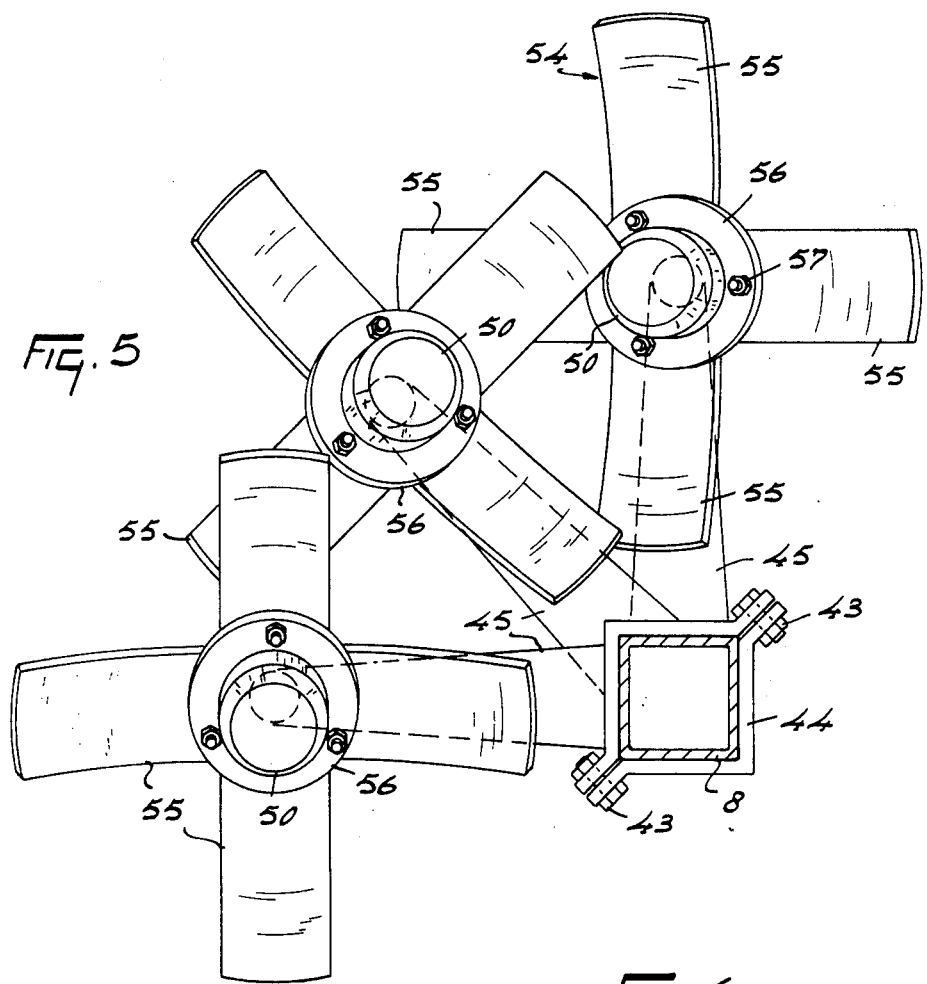
Figure 6:
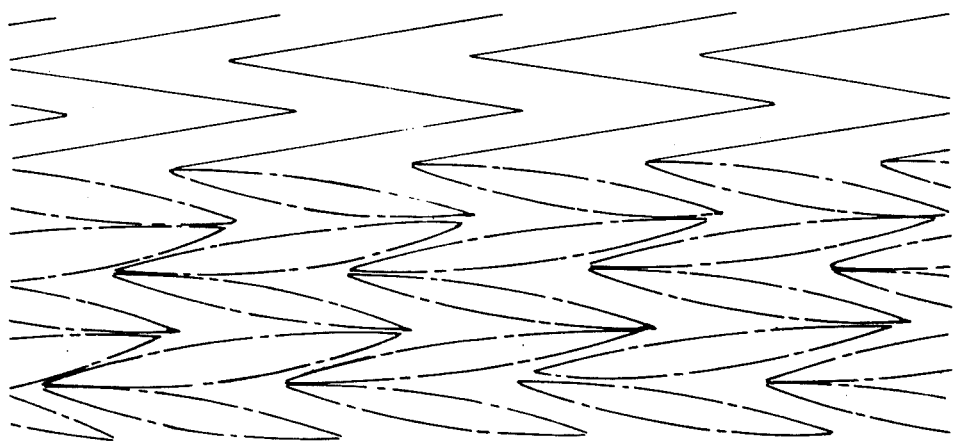

For a better understanding of the invention, and to show how the same may be carried into effect, reference will now be made, by way of example, to the accompanying drawings, in which:

FIG. 1 is a plan view of a soil cultivating machine or cultivator in accordance with the invention connected to the rear of an agricultural tractor, FIG. 2 is a side elevation as seen in the direction indicated by an arrow II in FIG. 1, FIG. 3 is a part-sectional elevation, to an enlarged scale, illustrating the construction, arrangement and mounting of soil cultivating means of the cultivator in greater detail, FIG. 4 is a part-sectional view as seen in the direction indicated by an arrow IV in FIG. 3, FIG. 5 is a similar view to FIG. 3 but illustrates an alternative construction of the soil cultivating means, and FIG. 6 is a diagrammatic illustration of the mode of operation of a soil cultivating machine or cultivator in accordance with the invention.

Referring to the drawings, the soil cultivating implements, machines or cultivators that are illustrated therein will hereinafter be referred to, throughout the descriptive portion of this Specification, merely as "cultivators", for the sake of brevity. The cultivator that is illustrated in FIGS. 1 to 3 of the drawings has a frame beam 1 of circular cross-section that extends substantially horizontally transverse, and normally substantially horizontally perpendicular, to the intended direction of operative travel of the cultivator which is indicated by an arrow A in FIGS. 1 and 2 of the drawings. The frame beam 1 is located at substantially the front of the cultivator with respect to the direction A and the leading ends of further beams 2 are secured to its opposite extremities in such a way that (see FIG. 2) said beams 2 are inclined upwardly and rearwardly with respect to the direction A from the frame beam 1. The rearmost and uppermost ends of the beams 2 are perpendicularly interconnected by a frame beam 3 of circular cross-section that extends parallel or substantially parallel to the frame beam 1 but at a higher horizontal level than the frame beam 1 and to the rear thereof with respect to the direction A. Supports 4 project downwardly and rearwardly from the frame beam 1 at equal distances from its midpoint and, similarly, supports 5 project downwardly, and forwardly to some extent, from the frame beam 3 at the same distances from the midpoint of that beam. The ends of the supports 4 and 5 that are remote from the beams 1 and 3 respectively are rigidly secured to the upper curved surface of a hood 6, the hood 6 being provided with substantially vertical side or end plates 7. Substantially horizontally aligned bearings are carried by the side or end plates 7 of the hood 6 in such a position that they define an axis of rotation which intersects, or is very close to, the center of curvature of the major curved wall of the hood 6 which, as will be evident from FIG. 2 of the drawings, is principally of cylindrically curved formation. Stub shafts 10 at the opposite ends of a substantially horizontal support 8 are rotatably journalled in the bearings that are carried by the side or end plates 7, said stub shafts 10 projecting beyond the bearings into transmission casings 11 which are fastened to the beams 2 alongside the relatively remote surfaces of the two side or end plates 7 so as to extend upwardly and forwardly with respect to the direction A, from bottom to top (see FIG. 2).

The support 8 is of a polygonal cross-section which it is preferred should be a square cross-section as illustrated. The support 8 is a central part of a cultivating member that is generally indicated by the reference 42, said cultivating member 42 being rotatable about the longitudinal axis $a$ of the support 8. Assemblies of two substantially identical brackets 44 whose shapes can be seen in FIGS. 2 and 3 of the drawings are clamped to the support 8 at regular intervals along the length of the latter by employing bolts 43 which are entered through the abutting, and substantially radially disposed with respect to the axis $a$, pairs of the limbs of the brackets 44. The two brackets 44 of each assembly or pair thereof engage around the four sides of the square cross-section support 8 and it will be seen from the drawings that each bracket 44 is provided with three substantially radially extending arms 45 that are offset from one another at substantially 45° intervals around the axis $a$. The brackets 44 are disposed substantially end-to-end along the support 8 and successive pairs thereof are turned through 90° about the axis $a$ with respect to their neighbours so that the bolts 43 of the pair of brackets 44 that are next to the pair of brackets 44 illustrated in FIG. 3 will be located "northwest" and "southeast" about the axis $a$ instead of "northeast" and "southwest" as shown in FIG. 3. The result is that the arms 45 that correspond to all of the brackets 44 extend in two helical rows around the axis $a$. The end of each arm 45 that is remote from the corresponding bracket 44 carries a corresponding shaft 46 which is integral with a relatively inclined stub shaft 47 that affords the free end of the shaft 46 concerned. Each stub shaft 47 is of partly frusto-conical configuration and affords the axis of rotation $c$ of a corresponding soil cultivating means 48 in the form of a rotary cap-shaped disc. A central region of the concave side of each means 48 has a bearing housing 50 secured to it by small bolts 53, said housing 50 containing a pair of ball bearings 49 that are maintained in axially spaced relationship along the corresponding stub shaft 47 by an intervening frusto-conical spacing sleeve 51. The assembly is completed by engaging a circlip 52 in a groove immediately adjacent to the free end of the stub shaft 47 but, if preferred, the circlip 52 could be replaced by a nut co-operating with a short screwthreaded extension of the stub shaft 47. In this embodiment, each of the soil cultivating means 48 is afforded by a rotary cap-shaped disc which has an uninterrupted circular edge that is not less than substantially 35 centimeter in diameter. However, if preferred, the edge may be of toothed or serrated form and this may conveniently be effected by forming said edge with a plurality of substantially regularly spaced apart semi-circular or substantially semi-circular recesses. The axis of rotation $c$ of each soil cultivating means 48 is inclined to the longitudinal axis of the corresponding shaft 46 and thus to a plane B(FIG. 4) that is perpendicular to the axis of rotation $a$ of the cultivating member 42. An angle whose magnitude is preferably 15° or substantially 15° is enclosed between each axis of rotation $c$ and a plane containing the longitudinal axis $a$ of the support 8.

It can be seen in FIGS. 3 and 4 of the drawings that, with respect to planes containing the axis of rotation $a$ and related to the direction of rotation of the cultivating member 42 about that axis that is indicated by an arrow near the bottom right-hand corner of FIG. 2, the stub shafts 47 that correspond to each helical row of arms 45 are alternately orientated forwardly and rearwardly. This ensures that, during operation of the cultivator, the successive soil cultivating means 48 work overlapping strips of soil and displace that soil in opposite directions from the corresponding strips. It will also be noted from FIGS. 1, 3 and 4 of the drawings that the concave sides of all of the soil cultivating means 48 all face one side of the cultivator while the convex sides of all of them face the opposite side of the cultivator.

The stub shafts 10 that project through the side or end plates 7 of the hood 6 are provided, inside the corresponding transmission casings 11, with sprocket wheels 26 and those sprocket wheels are in driven connection, by way of endless transmission chains 27, with smaller sprocket wheels 28 carried at the opposite ends of a rotary shaft 29 that extends parallel to the support 8 between the interiors of the two transmission casings 11. Most of the length of the shaft 29 is located inside a tubular casing 30 which is provided midway along its length with a gear box 31. The top of the gear box 31 is bolted to the bottom of a bar 32 which interconnects two rearwardly divergent tie beams 33 that form parts of a coupling member or trestle 34 which is disposed midway across the width of the cultivator, at the front thereof with respect to the direction A, the base of the coupling member or trestle 34 being secured to the leading frame beam 1 at locations which are close to the two supports 4. The coupling member or trestle 34 is constructed and arranged to enable the cultivator to be connected to the three-point lifting device or hitch of an agricultural tractor or other operating vehicle in a manner that is generally known per se and that is illustrated in outline in FIGS. 1 and 2 of the drawings. The tie beams 33 are divergent in a downward and rearward, with respect to the direction A, direction from the top of the coupling member or trestle 34 and their rearmost ends are secured to the frame beam 3 close to the corresponding supports 5. Meshing bevel pinions (not visible) inside the gear box 31 place the shaft 29 in driven connection with a substantially horizontal rotary input shaft 35 whose splined or otherwise keyed end projects forwardly in substantially the direction A from the front of the gear box 31. The rotary input shaft 35 is arranged to be placed in driven connection with the power take-off shaft of an agricultural tractor or other operating vehicle by way of an intermediate telescopic transmission shaft, which is of a construction that is known per se, having universal joints at its opposite ends.

Arms 37 are connected to the relatively remote surfaces of the two side or end plates 7 of the hood 6 so as to be turnable upwardly and downwardly, alongside those plates 7, about a substantially horizontal axis that is substantially parallel to the support 8 and that is defined by pivot bolts or the like. The pivot bolts or the like are located towards the rear of the plates 7 with respect to the direction A and the arms 37 extend rearwardly, and downwardly to some extent, from them. A soil working member in the form of an open ground roller 38 is rotatably supported between the rearmost ends of the two arms 37 so as to extend throughout the working width of the cultivating member 42, the axis of rotation of the roller 38 being substantially parallel to the frame beams 1 and 3 and to the support 8. The roller 38 is mounted in a freely rotatable manner and its soil-engaging periphery comprises a plurality, such as eight, of elongate elements 39 in the form of rods or tubes that extend in the same general direction as the axis of rotation but that are wound helically around that axis to some extent. The elements 39 are, of course, spaced apart from one another at regular angular intervals around the axis of rotation of the roller 38. Curved rear regions of the side or end plates 7 of the hood 6 are formed with rows of holes 41 that are equidistantly spaced from the substantially horizontal axis about which the arms 37 are pivotable. The arms 37 themselves are formed with single holes that can be brought into register with chosen ones of the holes 41 and locking bolts 40 are provided for entry through the holes in the arms 37 and the chosen holes 41 to maintain those arms 37, and thus the roller 38, at a corresponding angular setting about the axis that is defined by the above-mentioned pivot bolts or the like. The level of the axis of rotation of the roller 38 that is chosen relative to the level of the cultivating member 42 and other parts of the cultivator is a principal factor in determining the depth to which the soil cultivating means 48 can penetrate into the soil during the operation of the cultivator.

In the use of the cultivator that has been described, its coupling member or trestle 34 is connected to the three-point lifting device of an agricultural tractor or other operating vehicle and the rotary input shaft 35 of the gear box 31 is placed in driven connection with the power-takeoff shaft of the same tractor or other vehicle by employing the telescopic transmission shaft (not shown) that has universal joints at its opposite ends. The transmission between the shaft 35 and the support 8 is so arranged that the cultivating member 42 will rotate about the axis $a$ in the direction that is indicated by the arrow near the bottom right-hand corner of FIG. 2 of the drawings which direction is such that the various soil cultivating means 48 will pass rearwardly through the soil relative to the direction A. As previously mentioned, successive soil cultivating means 48 work overlapping strips of land and displace soil from those strips in opposite directions. This is illustrated diagrammatically in FIG. 6 of the drawings. It can be seen from FIGS. 2 and 3 of the drawings that the edges of the freely rotatable mounted soil cultivating means 48 are quite close to the axis of rotation $a$ of the whole cultivating member 42. The edges of the successive soil cultivating means 48 engage the soil at locations which are spaced from the corresponding axes $c$ and this tends to bring said means 48 into rotation about those axes. Since the soil cultivating means 48 are freely rotatable about the axes $c$, they are thus capable of engaging the soil in a manner which adjusts itself automatically to the nature and condition of that soil. This is in contradistinction to known cultivators whose soil cultivating means are fixed in position relative to a shaft or the like embodying a substantially horizontal axis equivalent to the axis $a$. With such known cultivators, the soil is worked in much the same manner regardless of the nature and condition thereof and, under some conditions, such as when the soil is wet and heavy, that soil is compressed to an excessive extent which is generally undesirable having regard to the result required. It will be evedent from FIG. 2 of the drawings that there will always be several of the soil cultivating means 48 in engagement with the ground at any instant during the operation of the cultivator so that there is little, if any, jolting or "drag and snatch". The soil cultivating means 48 are spaced apart from one another by quite large distances which are sufficient to ensure that any significant clogging of the cultivating member 42 rarely, if ever, occurs. In addition to performing its depth control function, the roller 38 that is disposed behind the cultivating member 42 with respect to the direction A rotates freely about its own longitudinal axis and subjects the broad strip of soil that has been worked by the member 42 to a subsequent treatment. Any unbroken lumps or clods of soil tend to be broken up by the roller 38 and the roller has a generally levelling effect upon the soil surface.

FIG. 5 of the drawings illustrates an alternative construction in which the soil cultivating means 48 are replaced by soil cultivating means 54 that are of the same, or substantially the same, diameter as the means 48 but that comprise pairs of strip-shaped elements 55 arranged in perpendicular cruciform relationship with the two strips 55 of each pair contained in a corresponding imaginary cap-shaped surface. The free ends of the elements are rounded off and teir central regions are fastened to the flanges 56 of corresponding housings 50 by bolts 57. The soil cultivating means 54 are freely rotatable about the axes c of the stub shafts 47 and are particularly suitable for cultivating operations upon very hard and excessively dry soil. It will be seen from the arrows in FIG. 2 of the drawings that the soil cultivating means 48 or 54 tend to rotate about the axes c in opposite directions to the rotation of the whole member 42 about the axis a and it is noted that the leading edges of each element 55 with respect to the usual directions of rotation of the means 54 may be formed as cutting edges. If desired, the means 54 may be provided with more than two of the elements 55. For example, although not illustrated in the drawings, each means 54 may have three of the elements 55.

In the use of the cultivator when provided with either the means 48 or the means 54, a speed of travel in the direction A of substantially 100 meter per minute (6 kilometers per hour) is generally preferable, the cultivating member 42 being driven to revolve around the axis a at a speed which is preferably substantially 250 revolutions per minute. It is noted that, due to the direction of rotation of the cultivating member 42 which is indicated by an arrow near the bottom right-hand corner of FIG. 2 of the drawings, the cultivator tends to assist its own propulsion in the direction A so that the tractive effort that must be exerted in that direction by the agricultural tractor or other operating vehicle is not as great as might at first appear to be required.

Although various features of the cultivators that have been described, and that are illustrated in the accompanying drawings, will be set forth in the following claims as inventive features, it is emphasised that the invention is not necessarily limited to those features and that it includes within its scope each of the parts of each cultivator embodiment that has been described, and/or that is illustrated in the accompanying drawings, both individually and in various combinations.

What we claim is:

1. A soil cultivating machine comprising a frame and a driven soil cultivating member comprising support means, that is rotatable about a substantially horizontal axis of rotation that extends transverse to the normal direction of travel, a plurality of disc-shaped soil cultivating means connected to said support means and positioned around said axis of rotation, said cultivating means each being freely rotatable about a corresponding further axis of rotation spaced from said first mentioned axis of rotation, said further axis being non-perpendicularly inclined to a plane containing said horizontal axis of rotation, said cultivating means being mounted on arms that extend outwardly from said support means and said arms being arranged on a bracket connected to said support means, said arms being angularly spaced apart from one another around the axis of rotation of said support means and a plurality of brackets with corresponding cultivating means being mounted along the length thereof, the last arm on one of said brackets being angularly spaced around said support means from a first arm on an adjacent bracket, said arms extending from said support means and being arranged in at least one helical row, the outer ends of said arms carrying stub shafts and said stub shafts having longitudinal axes that define said further axes of rotation, successive soil cultivating means, considered lengthwise along said rotary support means, being inclined alternately forwardly and rearwardly relative to the normal operative direction of rotation of said cultivating member from the planes that contain said horizontal axes.

2. A machine as claimed in claim 1, wherein at least one soil cultivating means is a disc with an outer circular edge, said edge being located adjacent said support means during operation.

3. A machine as claimed in claim 1, wherein the arms of immediately neighboring soil cultivating means are angularly spaced apart from one another around said support means by at least 45°.

4. A machine as claimed in claim 3, wherein said soil cultivating means are mounted on corresponding arms that extend substantially radially with respect to said support means, said arms being arranged in groups of three on respective brackets that are clamped to said rotary support means.

5. A machine as claimed in claim 4, wherein said three arms are positioned successively one beside the other in echelon on said bracket.

6. A machine as claimed in claim 1, wherein said brackets adjoin one another along the length of said rotary support means.

7. A machine as claimed in claim 1, wherein each soil cultivating means is a disc that is substantially cap-shaped and the concave surfaces of all of said discs face towards the same side of said machine.

8. A machine as claimed in claim 1, wherein said plurality of soil cultivating means comprise disc groups mounted in pairs and immediately neighboring pairs of discs work substantially adjoining strips of soil during operation, two discs of each pair being positioned to displace soil in relative opposite directions during operation.

9. A machine as claimed in claim 1, wherein said soil cultivating means comprises at least two strip-shaped elements that cross one another.

10. A machine as claimed in claim 9, wherein said two elements are arranged in substantially perpendicular cruciform relationship.

11. A machine as claimed in claim 1, wherein a supporting roller is positioned behind said cultivating member with respect to the normal direction of travel, said roller being rotatable about a respective substantially horizontal axis.

12. A machine as claimed in claim 11, wherein the periphery of said roller is comprised of a plurality of elongate elements that extend in the same general direction as the respective axis of rotation of the roller adjusting means interconnecting said roller to said frame and said roller being retainable in any one of a plurality of different levels relative to said frame.

* * * * *